United States Patent Office 3,460,937
Patented Aug. 12, 1969

3,460,937
METHOD FOR RECOVERING VANADIUM FROM IRON-BASE ALLOYS
Heinrich W. Rathmann, Cambridge, Ohio, assignor to Foote Mineral Company, Exton, Pa., a corporation of Pennsylvania
No Drawing. Filed Aug. 31, 1967, Ser. No. 664,619
Int. Cl. C22b 55/00, 7/00
U.S. Cl. 75—84                                  10 Claims

ABSTRACT OF THE DISCLOSURE

A method for extracting vanadium from any iron-base alloys, for example, ferrophosphorus, by heating a molten iron-base allow containing vanadium with an oxide having a low heat of formation and silica to form a molten alloy and slag containing the vanadium as an oxide which may be separated from the molten alloy and treated to extract the vanadium.

My invention relates to the removal of vanadium from iron-base alloys and specifically from ferrophosphorus by the preferential oxidation of vanadium from ferrophosphorus to produce a slag having an improved vanadium/phosphorus ratio.

Ferrophosphorus is a by-product obtained during electric furnace smelting of phosphate rock in the production of elemental phosphorus. In this process the elemental phosphorus is volatilized and the iron present in the phosphate rock forms ferrophosphorus, the quantity of which increases with the iron content of the charge. The phosphate rock from which the ferrophosphorus is made contains approximately 0.1% to 0.50% $V_2O_5$. By-product ferrophosphorus contains about 24% to 28% phosphorus, 3.5% to 8% vanadium, and the balance iron and minor amounts of other elements present in the phosphate rock. This constitutes a substantial source of vanadium.

Various methods have been proposed for the removal of vanadium from ferrophosphorus including blowing the ferrophosphorus with oxygen. Oxygen blowing has the advantage of removing most of the vanadium, but the disadvantage of removing phosphorus and other elements present. The oxides form a slag containing a high percentage of $P_2O_5$.

My invention, on the other hand, provides a novel and economical process for preferentially removing vanadium from ferrophosphorus in a siliceous slag. I have found that the addition of silica to the slag suppresses the oxidation of phosphorus while increasing the oxidation of vanadium. The slag produced in accordance with my invention has a vanadium/phosphorus ratio substantially higher than ferrophosphorus or slags produced by oxidation of ferrophosphorus without the addition of flux.

Generally, my method includes mixing together ferrophosphorus, an oxide having a low heat of formation such as iron oxide and an acid slag former such as silica and charging said mixture in an electric furnace. As the charge melts, the vanadium is preferentially oxidized and combined with the silica to form a slag. After the charge is completely molten and the reactions completed, the molten alloy and slag are poured into a mold and separated. The slag may then be prepared for further treatment by well-known methods to extract the vanadium.

The addition of silica to the slag has no adverse effect upon subsequent processing for extraction of vanadium. The vanadium may be recovered readily from the slag by known roasting and leaching procedures, such as roasting with sodium chloride or sodium carbonate at 1300° F. to 1600° F., thereby converting the vanadium to water soluble sodium vanadate and then leaching the roasted residue with water to extract the vanadium.

My novel method can be used to remove vanadium from any iron-base alloy such as a vanadieferous pig iron. However, it is particularly adapted to iron-base alloys containing an acid element such as phosphorus which is not desired in the slag from which the vanadium is to be subsequently removed.

Any oxide having a heat of formation lower than $V_2O_5$ may be used. Thus, for example, iron oxide, copper oxide, and nickel oxide may be used. I prefer to use iron oxide, particularly hematite ore ($Fe_2O_3$) because it contains more oxygen per unit weight of iron. However, mill scale or magnetite ore ($Fe_3O_4$) are very satisfactory.

Any acid slag former may be used and will suppress the oxidation of acid elements such as phosphorus. Silica is preferred; however, titanium oxide, boric oxide, etc. may be used, but tend to be less effective or too expensive.

In Table I below I have set forth the broad and preferred ranges of the charge added to an electric furnace in carrying out my invention:

TABLE I

| Charge | Broad range (percent) | Preferred range (percent) |
|---|---|---|
| Ferrophosphorus | 40–80 | 50–70 |
| Iron oxide | 10–50 | 15–25 |
| Silica | 10–30 | 15–20 |

A low percentage of iron oxide will oxidize only a small percentage of the vanadium in the ferrophosphorus, whereas a higher percentage of iron oxide will oxidize a higher percentage of the vanadium, but also oxidizes more phosphorus with the result that a lower vanadium/phosphorus ratio is obtained. The addition of 18% to 20% iron oxide appears to present the optimum addition for achieving a balance of these factors. A low percentage of silica is ineffective for the suppression of phosphorus oxidation, while a high percentage will dilute the vanadium content of the slag. Accordingly, an addition of 18% silica seems to offer the best balance of these factors.

Any temperature at which the alloy and the slag are fluid is satisfactory. The temperature range in which the charge is satisfactorily melted is between 2860° F. to 3360° F. However, I prefer that the temperature be maintained below 3200° F. to avoid undue refractory attack, accordingly, the preferred range is between 2860° F. and 3200° F.

The following nonlimiting examples further illustrate my invention.

Example I

The following mixture was charged in an electric arc furnace:

|  | Lbs. |
|---|---|
| Ferrophosphorus | 200 |
| Mill scale | 60 |
| Silica sand | 58 |

The ferrophosphorus had the following constituents:

|  | Percent |
|---|---|
| Vanadium | 7.59 |
| Phosphorus | 26.40 |
| Chromium | 5.75 |
| Nickel | 1.44 |
| Silicon | 0.80 |
| Carbon | 0.067 |
| Iron | Balance | and the vanadium/phosphorus ratio was 0.29.

After the mixture became molten, a slag sample was taken. In normal production the slag and metal would have been separated and the vanadium removed from the slag by known methods. However, in order to further explore the reaction, three successive additions of 40 pounds each of mill scale were made to oxidize additional vanadium. After each addition had become molten, slag samples were taken. The analysis of the slag samples is shown in Table II.

TABLE II

|  | $V_2O_5$ (percent) | $P_2O_5$ (percent) | $SiO_2$ (percent) | FeO (percent) | V/P ratio |
|---|---|---|---|---|---|
| Initial melt | 12.82 | 4.37 | 44.76 | 11.23 | 3.76 |
| After first addition | 9.82 | 4.37 | 31.72 | 26.50 | 2.88 |
| After second addition | 7.82 | 4.37 | 26.96 | 28.22 | 2.29 |
| After third addition | 7.19 | 5.52 | 25.12 | 27.65 | 1.67 |

The slag also contained minor amounts of chromium and nickel oxides and some contamination from the furnace lining. The final slag weighed 272 pounds and contained 72.2% of the vanadium but only 12.4% of the phosphorus of the original ferrophosphorus. After the reaction was completed, the metal and alloy were tapped into a cast iron mold.

The refined ferrophosphorus weighed 207 pounds and contained in addition to iron and impurities

|  | Percent |
|---|---|
| Vanadium | 0.94 |
| Phosphorus | 19.00 | with a vanadium/phosphorus ratio of 0.05.

Example II

The following mixture was charged in an electric arc furnace in the same manner as in Example I:

|  | Lbs. |
|---|---|
| Ferrophosphorus | 179 |
| Mill scale | 60 |
| Silica sand | 58 |

The ferrophosphorus used in this example had previously been partially oxidized to remove 51% of the vanadium. The ferrophosphorus had the following constitutents:

|  | Percent |
|---|---|
| Vanadium | 4.10 |
| Phosphorus | 24.00 | and the vanadium/phosphorus ratio was 0.17.

After the mixture became molten, a slag sample was taken. Thereafter, two successive additions of 40 pounds each of mill scale were made to oxidize additional vanadium. After each addition had become molten, slag samples were taken. The analysis of the slag samples is shown in Table III.

TABLE III

|  | $V_2O_5$ (percent) | $P_2O_5$ (percent) | $SiO_2$ (percent) | FeO (percent) | V/P ratio |
|---|---|---|---|---|---|
| Initial melt | 4.91 | 6.41 | 40.52 | 28.22 | 0.98 |
| After first addition | 4.91 | 5.90 | 32.40 | 40.03 | 1.07 |
| After second addition | 5.18 | 10.30 | 27.68 | 37.44 | 0.64 |

The ferrophosphorus weighed 185 pounds and contained in addition to iron and small percentages of chromium, nickel, silicon and carbon,

|  | Percent |
|---|---|
| Vanadium | 0.28 |
| Phosphorus | 16.60 | and the vanadium/phosphorus ratio was 0.017.

The slag contained 73.2% of the inbound vanadium and 19.4% of the inbound phosphorus, while the final ferrophosphorus contained only 7.1% of the inbound vanadium.

The process may be operated either as a one step process as described above or as a two step process. As a one step operation approximately one half of the vanadium can be extracted from the ferrophosphorus as a slag having a very high vanadium/phosphorus ratio as illustrated by the initial melt in Example I. To remove most of the vanadium in a one step process, additional quantities of iron oxide may be added as in the examples and a slag having a moderately high vanadium/phosphorus ratio as is illustrated by the final slag in Example I.

As a two step operation, a slag having a very high vanadium/phosphorus ratio as illustrated by the initial melt in Example I is prepared in the first step. Approximately one half of the vanadium content of the ferrophosphorus is removed in this step. The slag is separated from the molten alloy and new additions of iron oxide and silica are made to the furnace containing the molten alloy. Almost all of the vanadium remaining in the ferrophosphorus is recovered in the second step which produces a slag with a relatively low vanadium content and vanadium/phosphorus ratio. This slag may then be used on a new quantity of ferrophosphorus. By recycling the slag to the first step of a new cycle, advantage may be taken of the high iron oxide content of the slag and the overall two step operation gives a vanadium recovery exceeding 90%.

While I have described certain presently preferred embodiments of my invention, it may be otherwise embodied within the scope of the appended claims.

I claim:

1. A method for removing vanadium from an iron-base alloy comprising:
   (A) mixing an iron-base alloy containing between 40 and 80 wt. percent of vanadium, between 10 and 30 wt. percent of an acid slag former and between 10 and 50 wt. percent of an oxide having a heat of formation lower than $V_2O_5$ to form a charge;
   (B) melting said charge to cause formation of an acid slag containing an oxide of vanadium; and
   (C) separating the slag containing the vanadium from said iron-base alloy.

2. A method as set forth in claim 1 wherein said iron-base alloy is ferrophosphorus.

3. A method as set forth in claim 1 wherein said oxide is an iron oxide.

4. A method as set forth in claim 1 wherein said acid slag former is silica.

5. A method for removing vanadium from ferrophosphorus comprising:
   (A) forming a charge containing between 40 and 80 wt. percent of said ferrophosphorus, between 10 and 50 wt. percent iron oxide, and between 10 and 30 wt. percent silica;
   (B) melting said charge to cause formation of a siliceous slag containing an oxide of vanadium; and
   (C) separating said slag containing the vanadium from said ferrophosphorus to thereby remove the vanadium from the ferrophosphorus.

6. A method as set forth in claim 5 wherein the charge comprises between 50 and 70 wt. percent ferrophosphorus, between 15 and 25 wt. percent iron oxide, and between 15 and 20 wt. percent silica.

7. A method as set forth in claim 5 wherein after the original charge is molten an additional quantity of iron oxide is added to the molten charge and is melted prior to separation of the slag from the ferrophosphorus.

8. A method for removing vanadium from ferrophosphorus comprising:
- (A) forming a charge containing between 40 and 80 wt. percent of said ferrophosphorus, between 10 and 50 wt. percent iron oxide, and between 10 and 30 wt. percent silica;
- (B) melting said charge to cause formation of siliceous slag containing an oxide of vanadium;
- (C) separating said slag from said ferrophosphorus thereby removing some of the vanadium from the ferrophosphorus;
- (D) adding an additional quantity of iron oxide and silica to the molten ferrophosphorus derived from step C;
- (E) melting the new charge to form a new step B; and
- (F) separating the second siliceous slag containing additional vanadium values from the ferrophosphorus to thereby remove additional vanadium from said ferrophosphorus.

9. A method as set forth in claim 8 including the following steps:
- (A) mixing the siliceous slag obtained in step F with ferrophosphorus, iron oxide and silica to form a third charge;
- (B) melting the third charge to cause formation of additional siliceous slag containing vanadium;
- (C) separating the slag containing vanadium from the ferrophosphorus.

10. A method as set forth in claim 9 wherein the ferrophosphorus obtained in step C is subsequently melted with additional iron oxide and silica to form a siliceous slag containing additional vanadium.

References Cited

UNITED STATES PATENTS

| | | | |
|---|---|---|---|
| 2,467,039 | 4/1949 | Kerschbaum et al. | 75—84 X |
| 2,654,655 | 10/1953 | Banning et al. | 75—132 X |
| 3,154,410 | 10/1964 | Darrow et al. | 75—84 X |
| 3,305,355 | 2/1967 | Darrow et al. | 75—132 |

CARL D. QUARFORTH, Primary Examiner

M. J. SCOLNICK, Assistant Examiner

U.S. Cl. X.R.

75—63, 132